US012573677B2

(12) United States Patent
Jang et al.

(10) Patent No.: US 12,573,677 B2
(45) Date of Patent: Mar. 10, 2026

(54) BATTERY MODULE ASSEMBLY

(71) Applicant: HYUNDAI MOBIS CO., LTD., Seoul (KR)

(72) Inventors: Jae Young Jang, Yongin-si (KR); Yong Jung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 560 days.

(21) Appl. No.: 18/090,204

(22) Filed: Dec. 28, 2022

(65) Prior Publication Data

US 2023/0344028 A1 Oct. 26, 2023

(30) Foreign Application Priority Data

Apr. 22, 2022 (KR) ........................ 10-2022-0050401

(51) Int. Cl.
*H01M 10/48* (2006.01)

(52) U.S. Cl.
CPC ....... *H01M 10/486* (2013.01); *H01M 10/482* (2013.01)

(58) Field of Classification Search
CPC .......................... H01M 10/486; H01M 10/482
See application file for complete search history.

(56) References Cited

U.S. PATENT DOCUMENTS 11,901,526 B2 * 2/2024 Lee ..................... H01M 50/569
2011/0090666 A1 * 4/2011 Rupert ................ H01M 10/656 361/829
2013/0164569 A1 * 6/2013 Srinivasan .......... H01M 10/486 429/7
2022/0359923 A1 * 11/2022 Lim .................. H01M 10/6556
2022/0359924 A1 * 11/2022 Lim .................... H01M 50/264
2023/0291022 A1 * 9/2023 Han .................... H01M 50/276
2024/0213555 A1 * 6/2024 Kim .................... H01M 10/486

FOREIGN PATENT DOCUMENTS

EP 0964470 B1 * 3/2011 ........ H01M 10/6566
JP 2010287550 A * 12/2010
KR 101917510 B1 * 11/2018 .......... H01M 10/482
WO WO-2015170581 A1 * 11/2015 .......... H01M 50/209

OTHER PUBLICATIONS

Machine Translation of KR-101917510-B1 (Jun. 26, 2025) (Year: 2025).*
Machine Translation of WO-2015170581-A1 (Jun. 26, 2025) (Year: 2025).*
Machine Translation of JP-2010287550-A (Jun. 26, 2025) (Year: 2025).*

* cited by examiner

*Primary Examiner* — Matthew J Merkling
(74) *Attorney, Agent, or Firm* — NSIP Law

(57) ABSTRACT

A battery module assembly including a cell stack in which a plurality of battery cells are stacked and formed in a horizontal direction, a pair of end plates arranged on both a first side and a second side of the cell stack in the horizontal direction, and a sensor device that is coupled to at least one end plate of the pair of end plates and measures a temperature of the cell stack, wherein the sensor device includes an upper sensor member that is disposed above the at least one end plate and measures a temperature of an upper side of the cell stack, and a lower sensor member that is disposed below the at least one end plate and measures a temperature of a lower side of the cell stack.

20 Claims, 12 Drawing Sheets

BATTERY MODULE ASSEMBLY

CROSS-REFERENCE TO RELATED APPLICATION

This application claims the benefit under 35 USC 119(a) of Korean Patent Application No. 10-2022-0050401, filed in the Korean Intellectual Property Office on Apr. 22, 2022, the entire disclosure of which are incorporated herein by reference for all purposes.

BACKGROUND

1. Field

The present disclosure relates to a battery module assembly.

2. Description of the Related Art

A battery module includes a plurality of battery cells. Further, for stability of the battery module, the battery module further includes a temperature sensor that senses temperatures of the plurality of battery cells.

In the related art, the temperature sensor is inserted from the outside of the battery cell to sense the temperature of the battery cell. To measure the temperature of the battery cell, since the temperature sensor should be inserted into the battery module, the battery module requires an opening into which the temperature sensor is inserted. That is, the battery module has a shape in which a portion of the battery cell is exposed to the outside through the opening.

Meanwhile, in the case of a module that does not need to measure a temperature, the temperature sensor is not inserted, and thus a dummy should be inserted to close the opening of the battery module. This has a problem in that the overall cost increases because cost for producing the dummy occurs.

Further, in the related art, due to a structural problem, only a temperature of an upper end of the battery cell may be measured. This makes it difficult to identify a temperature deviation between upper and lower ends of the battery cell and requires a separate structure for measuring a temperature at the lower end of the battery cell, thereby complicating the structure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a battery module assembly including a cell stack in which a plurality of battery cells are stacked and formed in a horizontal direction, a pair of end plates arranged on a first side and a second side of the cell stack in the horizontal direction, and a sensor device coupled to at least one end plate of the pair of end plates and configured to measure a temperature of the cell stack, the sensor device includes an upper sensor member disposed on an upper part of the at least one end plate and configured to measure a temperature of an upper side of the cell stack and a lower sensor member disposed on a lower part of the at least one end plate and configured to measure a temperature of a lower side of the cell stack.

The at least one end plate may include an inner plate member in which an upper hole into which the upper sensor member is inserted and a lower hole into which the lower sensor member is inserted are formed and which is in contact with the cell stack and an outer plate member coupled to an outer surface of the inner plate member.

The sensor device may include a substrate member that extends in an vertical direction and is configured to connect the upper sensor member and the lower sensor member to each other.

The sensor device may also include a connector member that is connected to the substrate member, the connector member being located above the upper sensor member, and the connector member being open in an upward direction.

The sensor device may also include a reinforcement member coupled to the connector member in an inward direction. Both ends of the reinforcement member may be coupled in a front-rear direction to the inner plate member.

The inner plate member further may include a first groove defined therein that communicates with the upper hole, the first groove being formed above the upper hole, and a width of the first groove in the horizontal direction may be smaller than a diameter of the upper hole, and the first groove is open in the inward direction, and the reinforcement member is insertable into the first groove.

The substrate member may include a first portion connected to the connector member and extending downward, a second portion which is recessed in an inward direction, the second portion being open in an outward direction, the second portion receiving the upper sensor member, the second portion is inserted into the upper hole, a third portion extending downward from a lower end of the second portion, and a fourth portion being connected to a lower end of the third portion, the fourth portion being recessed in the inward direction and open in the outward direction, the fourth portion receiving the lower sensor member, the fourth portion is inserted into the lower hole.

The substrate member may also include a fifth portion extending downward from a lower end of the fourth portion. The inner plate member further may include a coupling protrusion formed below the lower hole and protruding in the outward direction and the fifth portion further includes a protrusion insertion hole defined therein into which the coupling protrusion is inserted.

The inner plate member may include a second groove defined therein that communicates with the lower hole, the second groove being formed below the lower hole, a width of the second groove in the horizontal direction being smaller than a diameter of the lower hole, and the second groove being open in the outward direction, and the fifth portion may be inserted into the second groove.

When viewed from a top perspective, the third portion and the fifth portion may be spaced apart from each other in the horizontal direction.

The battery module assembly may also include a pressing part being in contact with each of outer side surfaces of the pair of end plates, the pressing part extending in the horizontal direction, the pressing part may be configured to press each one of the pair of end plates respectively in an inward direction.

Each one of the pair of end plates may include an inner plate member, the inner plate member being in contact with the cell stack and an outer plate member coupled to an outer side surface of the inner plate member. The pressing part may include a first pressing member in contact with an outer side surface of the outer plate member and a second pressing member coupled to a lower portion of the first pressing member, the second pressing member extending in the inward direction, the second pressing member being in contact with the inner plate member.

An upper surface of the second pressing member may be in contact with a lower end of the outer plate member.

The inner plate member may include a pair of restriction portions protruding outward from front and rear sides of the second pressing member and the second pressing member is positioned between the pair of restriction portions.

The at least one end plate may include an upper hole defined therein into which the upper sensor member is inserted and a lower hole defined therein into which the lower sensor member is inserted is formed.

The outer plate member may be coupled to the inner plate member through a thermal fusion process.

Each one of the pair of end plates may also include an adhesive member configured to adhere to an inner side surface of the outer plate member and an outer side surface of the inner plate member to adhere the outer plate member and the inner plate member to each other.

The outer plate member can include a contact region in contact with the inner plate member and a separation region that is configured to be spaced apart from the inner plate member.

In another general aspect, here is provided a battery module assembly including a plurality of battery cells stacked and arranged in a horizontal direction, a pair of end plates arranged on a first side and a second side of the plurality of battery cells in the horizontal direction, and a pair of sensor devices coupled to a respective one of the pair of end plates and configured to measure a temperature of the plurality of battery cells, the pair of sensor devices each includes an upper sensor member disposed on an upper part of the respective one of the pair of end plates and configured to measure a temperature of an upper side of the plurality of battery cells and a lower sensor member disposed on a lower part of the respective one of the pair of end plates and configured to measure a temperature of a lower side of the plurality of battery cells.

In yet another general aspect, here is provided battery module assembly including a cell stack including a plurality of battery cells, the plurality of battery cells being arranged in a stacked formation in a horizontal direction, a first end plate provided on a first side of the cell stack in the horizontal direction, a second end plate provided on a second side of the cell stack in the horizontal direction, and a sensor device coupled to the first end plate and configured to measure a temperature of the cell stack, the sensor device includes an upper sensor member disposed on an upper part of the first end plate and configured to measure a temperature of an upper side of the cell stack and a lower sensor member disposed on a lower part of the first end plate and configured to measure a temperature of a lower side of the cell stack.

BRIEF DESCRIPTION OF THE DRAWINGS

FIG. 12 is a view illustrating a state in which FIG. 11 is viewed in another direction.

Figure 1:
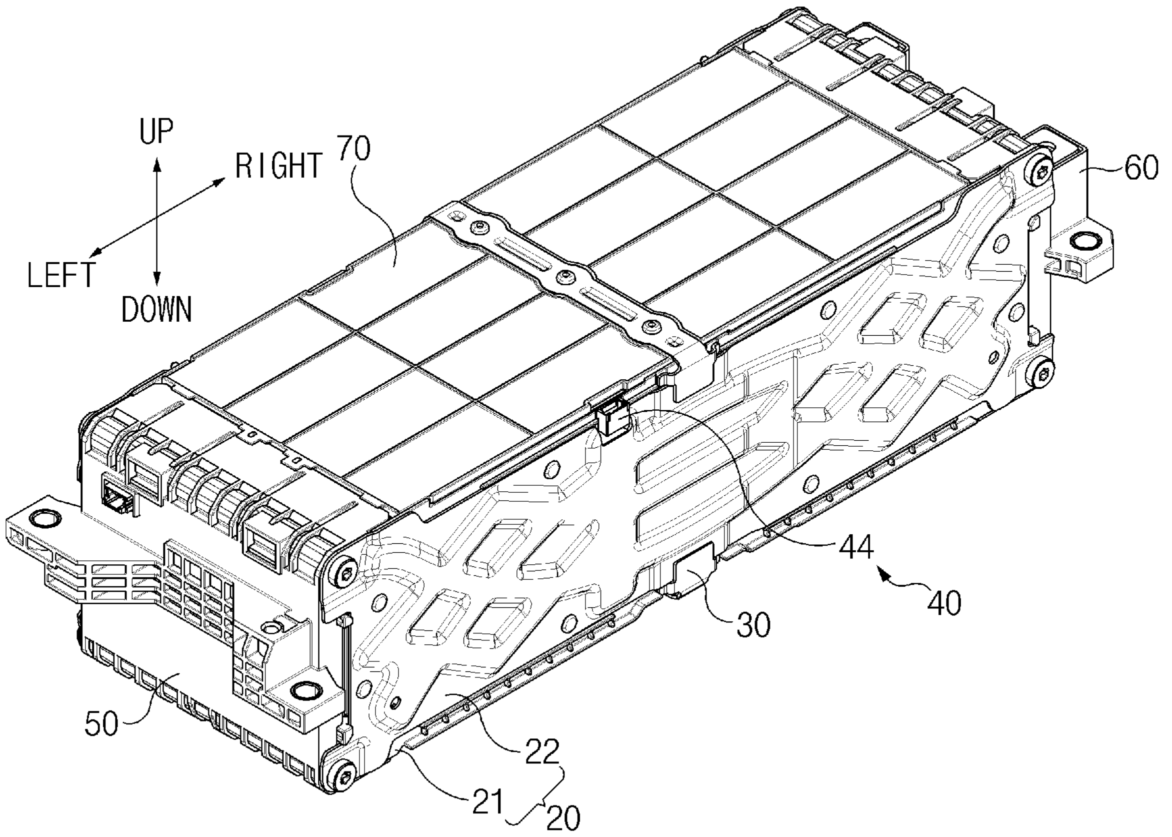
FIG. 1 is a view illustrating a battery module according to one embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
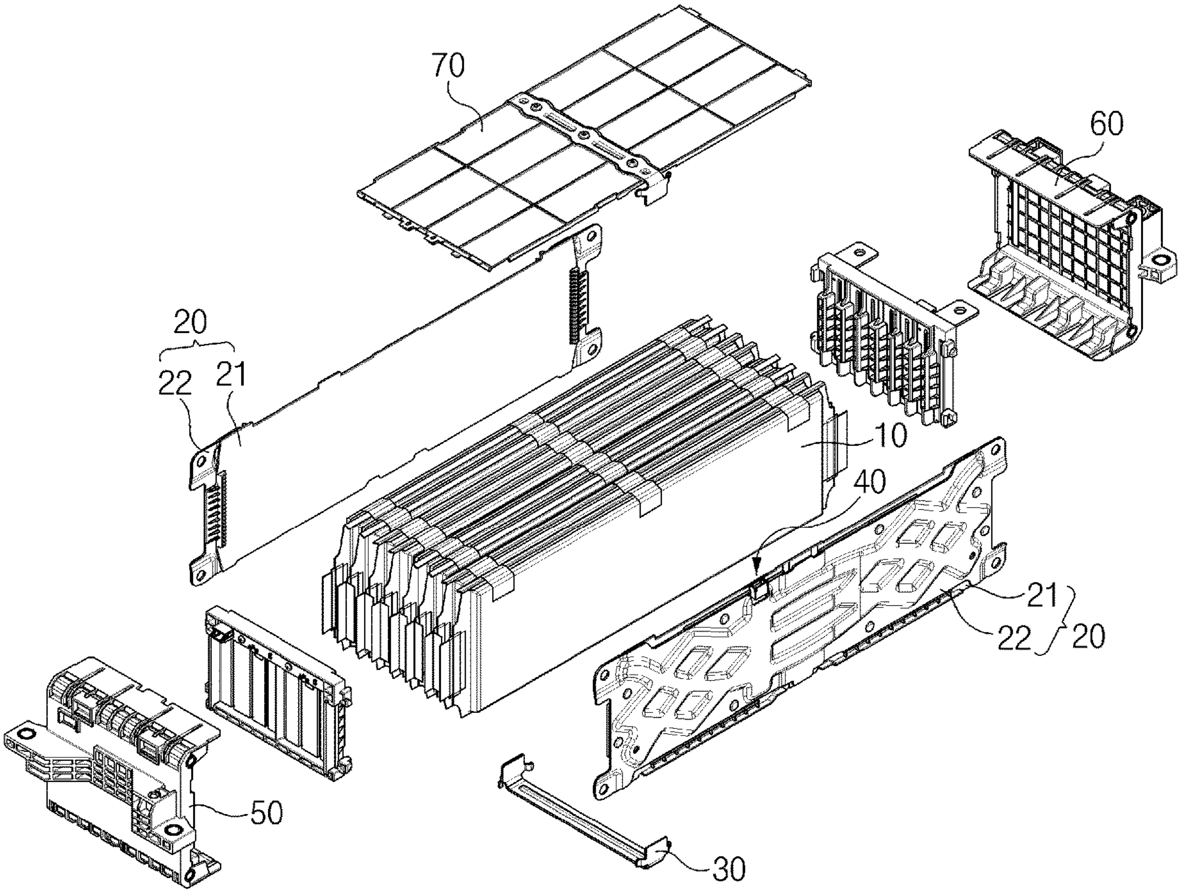
FIG. 2 is an exploded perspective view of FIG. 1.

FIG. 1 is a view illustrating a battery module according to one embodiment of the present disclosure. FIG. 2 is an exploded perspective view of FIG. 1.

A battery module assembly according to an embodiment of the present disclosure may include a cell stack 10, an end plate 20, and a sensor device 40. A plurality of battery cells may be stacked and formed in the cell stack 10 in a left-right, or horizontal, direction. The battery cell may be a lithium secondary battery, but the present disclosure is not limited thereto. The battery cell may include an electrode assembly and an exterior material. In the electrode assembly, a positive electrode plate and a negative electrode plate, to which a positive electrode active material and a negative electrode active material are respectively applied, may be arranged and formed with a separator interposed therebetween. As an example, the positive active material may be a lithium-based oxide. Further, the negative active material may be a carbon material.

Figure 3:
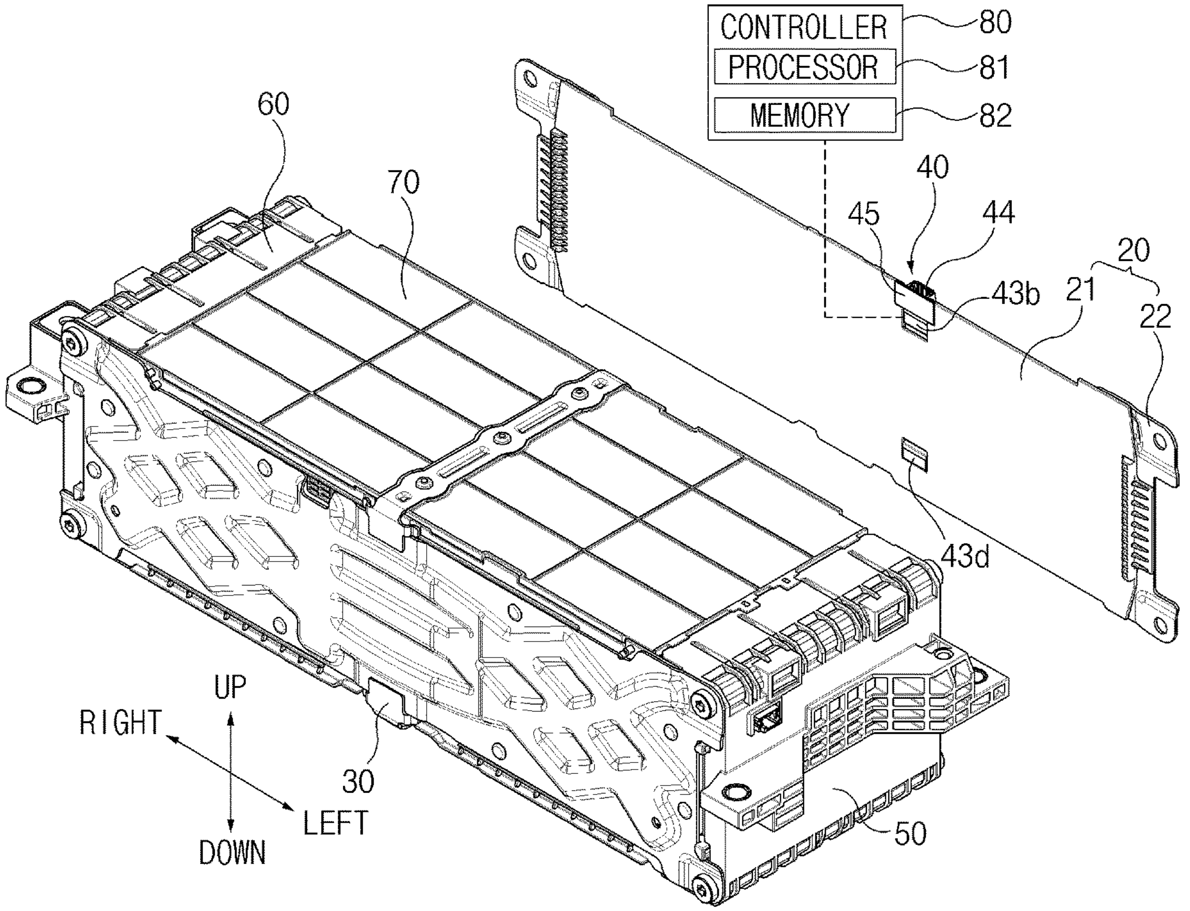
FIG. 3 is a view illustrating a state in which one end plate is separated in FIG. 1.

FIG. 3 is a view illustrating a state in which one end plate is separated in FIG. 1. The end plates 20 may be arranged on both sides of the cell stack 10 in a left-right direction. The end plate 20 may prevent swelling of the cell stack 10 by pressing the cell stack 10. The end plate 20 may be provided as a pair of end plates 20. The pair of end plates 20 may be pressed by a pressing part 30 in an inward direction. The inward direction may mean a direction in which the end plate 20 faces the cell stack 10. An outward direction may mean a direction opposite to the inward direction.

The pressing part 30 may be provided to be in contact with outer side surfaces of the pair of end plates 20, extend in the left-right direction, and press the pair of end plates 20 in the inward direction. The pressing part 30 may be a clamp. As an example, the pressing part 30 may be welded and coupled to each of the outer side surfaces of the pair of end plates 20. The pressing part 30 may be disposed one by one in upper and lower sides or may be disposed only on either the upper side or the lower side.

The sensor device 40 may be coupled to the end plate 20 and provided to measure a temperature of the cell stack 10. The sensor device 40 may include an upper sensor member 41 (see FIG. 6) and a lower sensor member 42 (see FIG. 6). The upper sensor member 41 may be disposed on an upper part of the end plate 20 and provided to measure a temperature on an upper side of the cell stack 10. The lower sensor member 42 may be disposed on a lower part of below the end plate 20 and provided to measure a temperature of a lower side of the cell stack 10.

Meanwhile, the sensor device 40 may be connected to a controller 80. The controller 80 may control the sensor device 40 to measure the temperature of the cell stack 10. The controller 80 may include a processor 81 and a memory 82. The processor 81 may include a microprocessor such as a field programmable gate array (FPGA), an application specific integrated circuit (ASIC), and a central processing unit (CPU). The memory 82 may store control instructions that are a basis for generating, in the processor 81, an instruction or the like for determining whether the sensor device operates. The memory 82 may be a data store such as a hard disk drive (HDD), a solid state drive (SSD), a volatile medium, and a nonvolatile medium.

In addition, the battery module may include a front cover 50, a rear cover 60, and an upper cover 70. The front cover 50, the rear cover 60, and the upper cover 70 may cover a front surface, a rear surface, and an upper surface of the cell stack 10, respectively.

According to the present disclosure, since both the temperatures of the upper and lower ends of the battery cell may be measured, the temperature of the module may be managed effectively, and thus life expectancy may increase. Further, according to the present disclosure, since the temperature sensor may be disposed inside the module, unlike the related art, mounting of a dummy is not required, and thus cost may be reduced.

Hereinafter, a detailed structure for achieving these effects will be described below.

Figure 4:
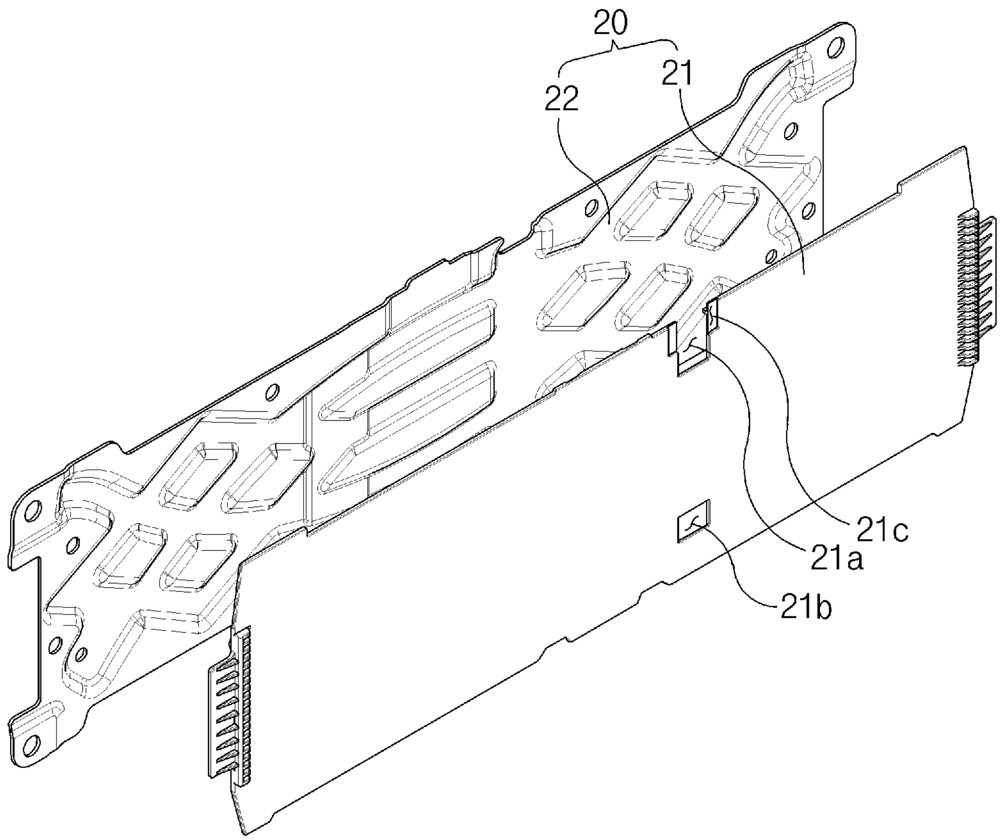
FIG. 4 is a view illustrating an inner plate member and an outer plate member.

FIG. 4 is a view illustrating an inner plate member and an outer plate member. The end plate 20 may include an inner plate member 21 and an outer plate member 22.

Figure 5:
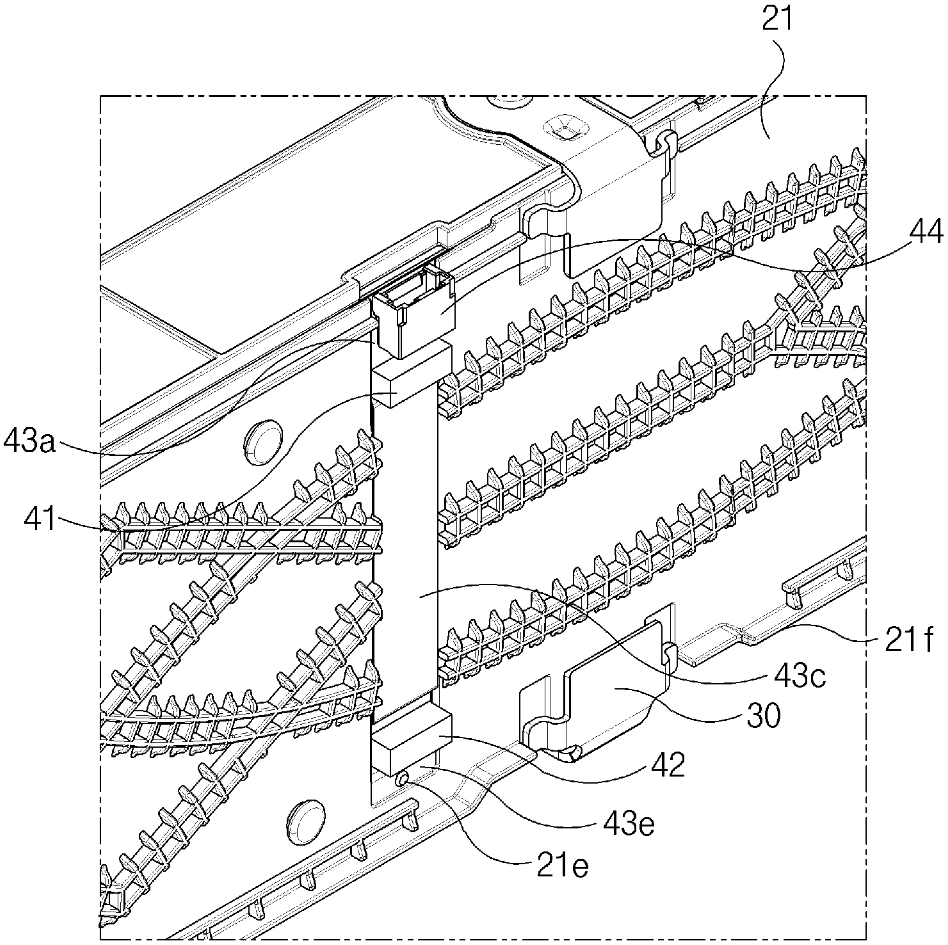
FIG. 5 is an enlarged view illustrating outer side surfaces of the inner plate member.

FIG. 5 is an enlarged view illustrating outer side surfaces of the inner plate member. An upper hole 21*a* and a lower hole 21*b* may be formed in the inner plate member 21. The upper hole 21*a* may be provided such that the upper sensor member 41 is inserted thereinto. The lower hole 21*b* may be provided such that the lower sensor member 42 is inserted thereinto. The inner plate member 21 may be in contact with the cell stack 10. The inner plate member 21 may be formed of an insulator. The inner plate member 21 may be a structure for insulating a current leaking from the battery cell.

The outer plate member 22 may be coupled to an outer surface of the inner plate member 21. For example, the inner plate member 21 may be coupled to the outer plate member 22 through thermal fusion.

As still another example, the inner plate member 21 may be coupled to the outer plate member 22 through an adhesive member (not illustrated). As an example, the adhesive member may be a double-sided tape. The adhesive member may adhere to an inner side surface of the outer plate member 22 and the outer side surface of the inner plate member 21 and thus allow the outer plate member 22 and the inner plate member 21 to adhere to each other.

The outer plate member 22 may include a contact region in contact with the inner plate member 21 and a separation region that is a region spaced apart from the inner plate member 21. This may mean that a portion of the outer plate member 22 is in contact with the inner plate member 21. As the outer plate member 22 includes the separation region, when the outer plate member 22 and the inner plate member 21 is joined to each other by laser welding, a phenomenon may be prevented in which a region of the inner plate member 21 having a position corresponding to the separation region is thermally deformed or melted.

The outer plate member 22 may be a structure for securing module rigidity and cell surface pressure. To this end, the outer plate member 22 may be made of a material having relatively high rigidity, such as a metal.

Figure 6:
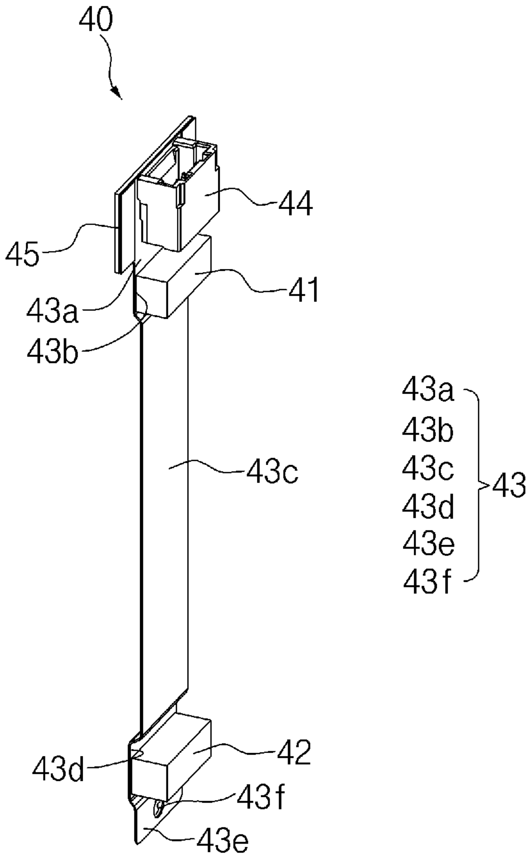
FIG. 6 is a view illustrating a sensor device.

Meanwhile, the sensor device 40 may further include a substrate member 43. FIG. 6 is a view illustrating a sensor device; The substrate member 43 extends in a vertical direction and is configured such that the upper sensor member 41 and the lower sensor member 42 are connected to each other as well as the upper sensor member 41 and the lower sensor member 42 are seated thereon. As an example, the substrate member 43 may be a flexible printed circuit board (FPCB).

Further, the sensor device 40 may further include a connector member 44. The connector member 44 may be connected to the substrate member 43, may be positioned above the upper sensor member 41, and may be open upward. The connector member 44 may be connected to an external electrical component. When the connector member 44 is connected to the external electrical component, the upper sensor member 41 and the lower sensor member 42 may operate.

According to the present disclosure, since only the connector member 44 is exposed to the outside and the upper sensor member 41 and the lower sensor member 42 are operated by the connection between the connector member 44 and the external electrical component, the battery cell is not exposed to the outside.

Meanwhile, the substrate member 43 may have a partially bent shape. For example, the substrate member 43 may include first, second, third, and fourth portions 43*a*, 43*b*, 43*c*, and 43*d*. The first portion 43*a* may be connected to the connector member 44 and extend downward. The first portion 43*a* may be in contact with the outer surface of the inner plate member 21.

The second portion 43*b* may be recessed in an inward direction and open in an outward direction. For example, a shape of the second portion 43*b* viewed from the front side may be a shape obtained by rotating a "U" shape by 90 degrees. The upper sensor member 41 may be inserted into the second portion 43*b*. As an example, a height of the second portion 43*b* in the vertical direction may correspond to a height of the upper sensor member 41. Further, the second portion 43*b* may be provided to be inserted into the upper hole 21*a*. The second portion 43*b* may be in contact with the battery cell.

The third portion 43*c* may extend downward from a lower end of the second portion 43*b*. The fourth portion 43*d* may be connected to a lower end of the third portion 43*c*, may be recessed in an inward direction, and may be open in an outward direction. Further, the third portion 43*c* may be in contact with the outer surface of the inner plate member 21.

The lower sensor member 42 may be inserted into the fourth portion 43*d*. As an example, a height of the fourth portion 43*d* in the vertical direction may correspond to a height of the lower sensor member 42 in the vertical direction. Further, the fourth portion 43*d* may be provided to be inserted into the lower hole 21*b*. The fourth portion 43*d* may be in contact with the battery cell. For example, a shape of the fourth portion 43*d* viewed from the front side may be a shape obtained by rotating a "U" shape by 90 degrees.

The substrate member 43 may further include a fifth portion 43*e*. The fifth portion 43*e* may extend downward from a lower end of the fourth portion 43*d*. Further, the fifth portion 43*e* may be in contact with the outer surface of the inner plate member 21. As an example, the fifth portion 43*e* may be coupled to the inner plate member 21 through a double-sided tape. Further, when viewed from the top, the third portion 43*c* and the fifth portion 43*e* may be spaced apart from each other in the left-right direction.

The sensor device 40 may further include a reinforcement member 45. The reinforcement member 45 may be coupled to the connector member 44 in an inward direction. A length of the reinforcement member 45 in a front-rear direction may be greater than a length of the connector member 44 in the front-rear direction. Both ends of the reinforcement member 45 in the front-rear direction may be coupled to the inner plate member 21.

Figure 7:
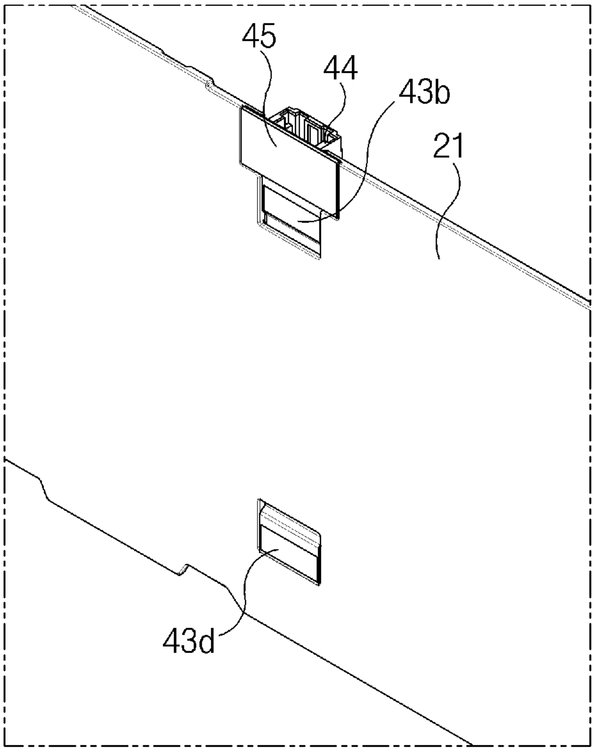
FIG. 7 is a view illustrating a state in which a reinforcement member is inserted into a first groove.
Figure 8:
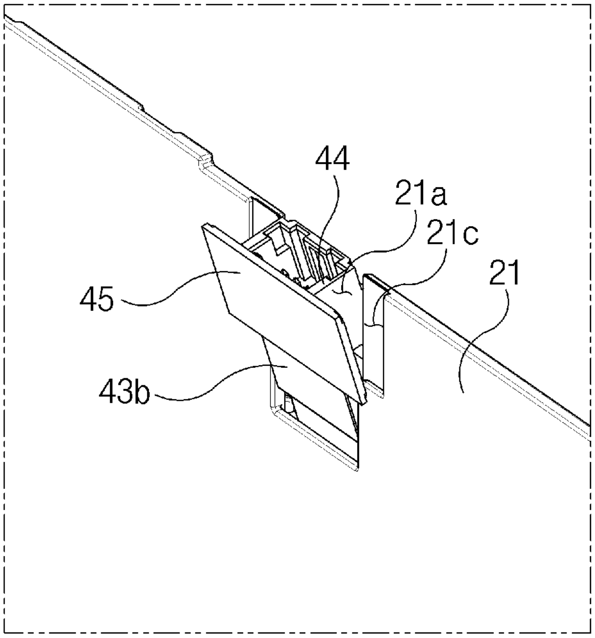
FIG. 8 is a view illustrating a state in which the reinforcement member is separated from the first groove.

FIG. 7 is a view illustrating a state in which a reinforcement member is inserted into a first groove. FIG. 8 is a view illustrating a state in which the reinforcement member is separated from the first groove. The inner plate member 21 may further include a first groove 21*c* into which the reinforcement member 45 is inserted. The first groove 21*c* may communicate with the upper hole 21*a*, may be formed above the upper hole 21*a*, may be formed such that a width thereof in the left-right direction is smaller than the upper hole 21*a*, and may be open inward. As the reinforcement member 45 is inserted into the first groove 21*c*, the position of the connector member 44 may be fixed.

Figure 9:
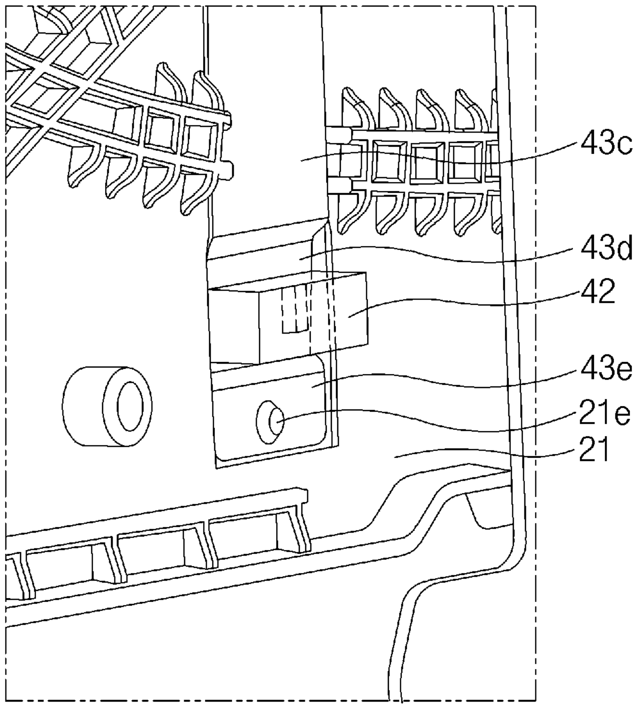
FIG. 9 is a view illustrating a state in which a fifth portion is inserted into a second groove.
Figure 10:
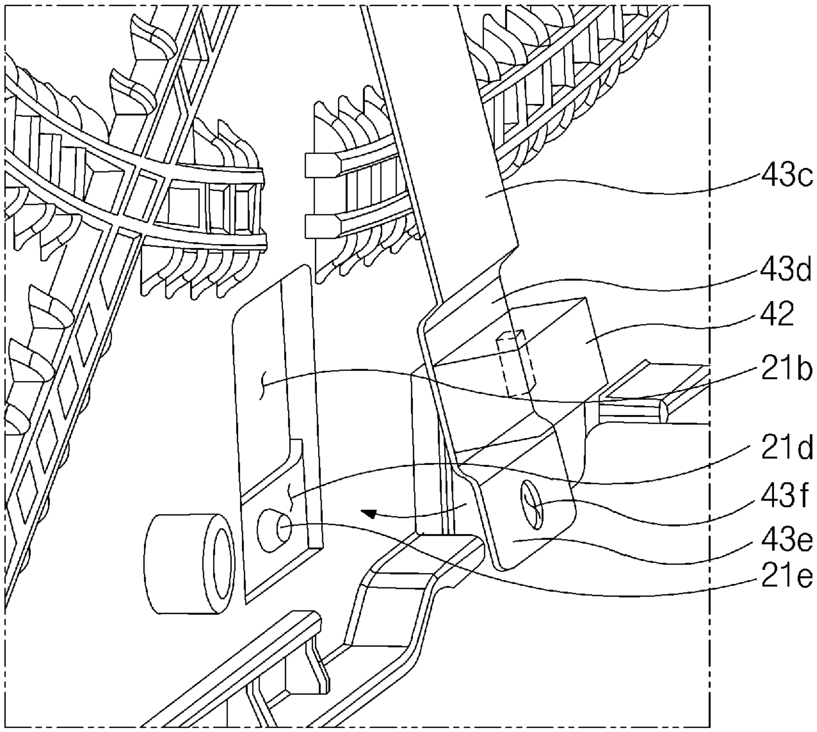
FIG. 10 is a view illustrating a state in which the fifth portion is separated from the second groove.

FIG. 9 is a view illustrating a state in which a fifth portion is inserted into a second groove. FIG. 10 is a view illustrating a state in which the fifth portion is separated from the second groove. The inner plate member 21 may include a second groove 21*d* into which the fifth portion 43*e* is inserted. The second groove 21*d* may communicate with the lower hole 21*b*, may be formed below the lower hole 21*b*, may be formed such that a width thereof in the left-right direction is smaller than the lower hole 21*b*, and may be open outward.

Meanwhile, the fifth portion 43*e* may further include a protrusion insertion hole 43*f* into which a coupling protrusion 21*e* is inserted. The coupling protrusion 21*e* may be positioned below the lower hole 21*b* of the inner plate member 21 and protrude outward. The protrusion insertion hole 43*f* and the coupling protrusion 21*e* may serve as a kind of guide when the substrate member 43 is coupled to the inner plate member 21.

Figure 11:
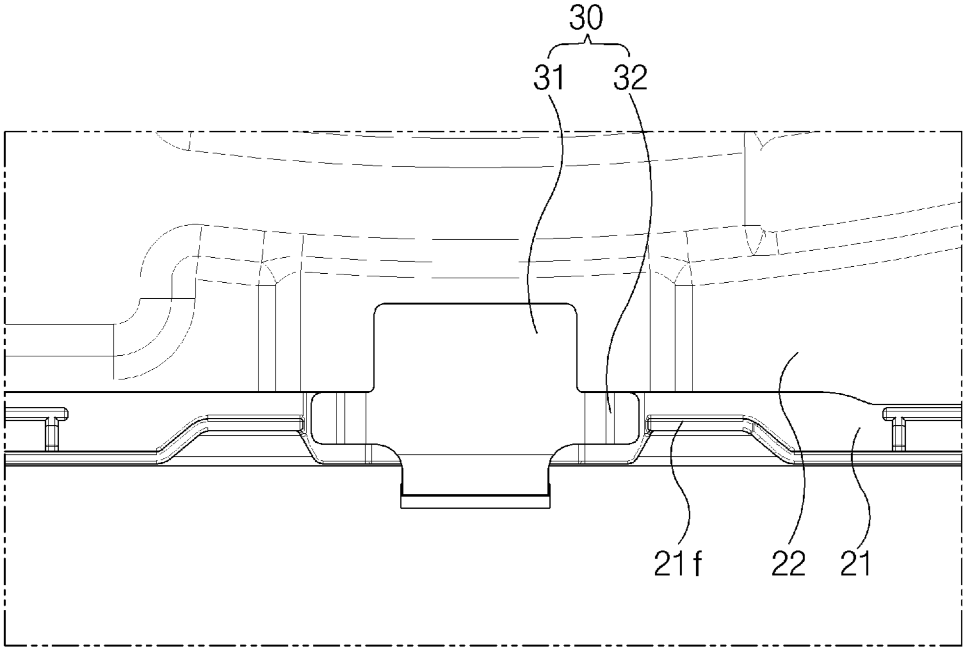
FIG. 11 is an enlarged view illustrating a pressing part.
Figure 12:
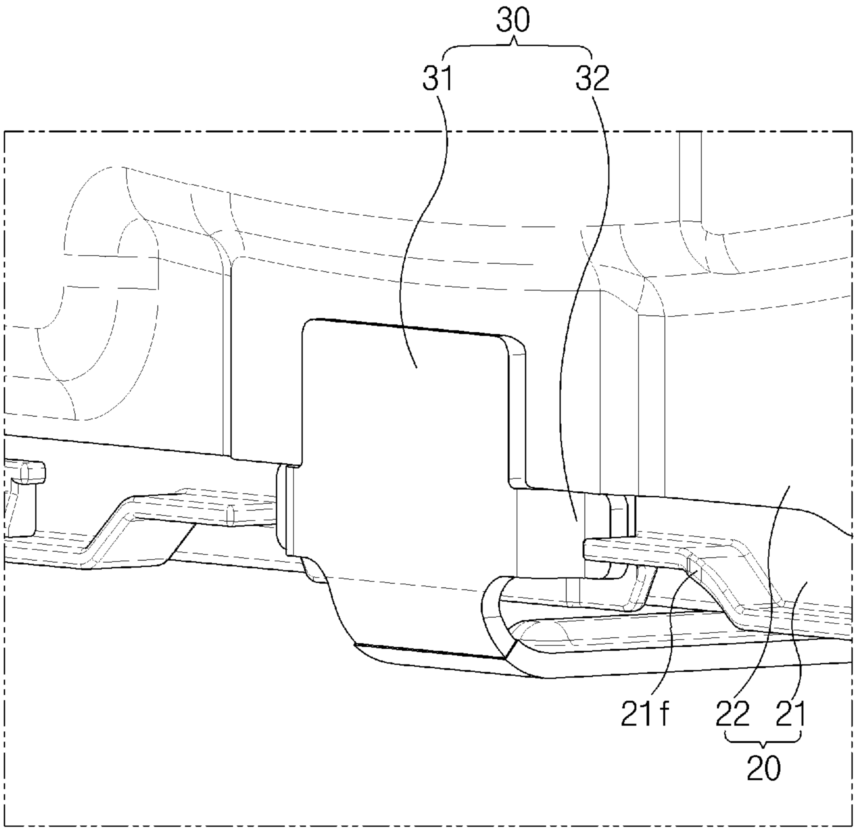

Meanwhile, the pressing part 30 may include a first pressing member 31 and a second pressing member 32. FIG. 11 is an enlarged view illustrating a pressing part. FIG. 12 is a view illustrating a state in which FIG. 11 is viewed in another direction.

The first pressing member 31 may be in contact with an outer side surface of the outer plate member 22. As an example, the first pressing member 31 may be welding to the outer side surface of the outer plate member 22.

The second pressing member 32 may be coupled to a lower portion of the first pressing member 31, may extend inward, and may be in contact with the inner plate member 21.

Further, an upper surface of the second pressing member 32 may be in contact with a lower end of the outer plate member 22. As the upper surface of the second pressing member 32 and the lower end of the outer plate member 22 are in contact with each other, the position of the second pressing member 32 in the vertical direction may be guided before the first pressing member 31 is welded to the outer plate member 22.

Further, the inner plate member 21 may include a pair of restriction portions 21*f* protruding outward from front and rear sides of the second pressing member 32. The second pressing member 32 may be positioned between the pair of restriction portions 21*f*. As the second pressing member 32 is positioned between the pair of restriction portions 21*f*, the position of the second pressing member 32 in the front-rear direction may be guided before the first pressing member 31 is welded to the outer plate member 22.

According to the present disclosure, since a temperature sensor may be disposed inside a module, mounting of a dummy is not required, and thus cost may be reduced.

Further, according to the present disclosure, since both temperatures of the upper and lower ends of a battery cell may be measured, the temperature of the module may be managed effectively, and thus life expectancy may increase.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery module assembly, comprising:

a cell stack in which a plurality of battery cells are stacked and formed in a horizontal direction;

a pair of end plates arranged on a first side and a second side of the cell stack in the horizontal direction; and a sensor device coupled to at least one of the pair of end plates and configured to measure a temperature of the cell stack, wherein the sensor device comprises:

an upper sensor member disposed on an upper part of the at least one end plate and configured to measure a temperature of an upper side of the cell stack; and a lower sensor member disposed on a lower part of the at least one end plate and configured to measure a temperature of a lower side of the cell stack.

2. The battery module assembly of claim 1, wherein the at least one end plate comprises:

an inner plate member in which an upper hole into which the upper sensor member is inserted and a lower hole into which the lower sensor member is inserted are formed and which is in contact with the cell stack; and an outer plate member coupled to an outer surface of the inner plate member.

3. The battery module assembly of claim 2, wherein the sensor device further comprises a substrate member that extends in a vertical direction and is configured to connect the upper sensor member and the lower sensor member to each other.

4. The battery module assembly of claim 3, wherein the sensor device further comprises a connector member that is connected to the substrate member, the connector member being located above the upper sensor member, and wherein the connector member is open in an upward direction.

5. The battery module assembly of claim 4, wherein the sensor device further comprises a reinforcement member coupled to the connector member in an inward direction, and wherein both ends of the reinforcement member are coupled in a front-rear direction to the inner plate member.

6. The battery module assembly of claim 5, wherein the inner plate member further includes a first groove defined therein that communicates with the upper hole, the first groove being formed above the upper hole, wherein a width of the first groove in the horizontal direction is smaller than a diameter of the upper hole, and wherein the first groove is open in the inward direction, and wherein the reinforcement member is inserted into the first groove.

7. The battery module assembly of claim 4, wherein the substrate member comprises:

a first portion connected to the connector member and extending downward;

a second portion which is recessed in an inward direction, the second portion being open in an outward direction, the second portion receiving the upper sensor member, wherein the second portion is inserted into the upper hole;

a third portion extending downward from a lower end of the second portion; and a fourth portion being connected to a lower end of the third portion, the fourth portion being recessed in the inward direction and open in the outward direction, the fourth portion receiving the lower sensor member, wherein the fourth portion is inserted into the lower hole.

8. The battery module assembly of claim 7, wherein the substrate member further comprises a fifth portion extending downward from a lower end of the fourth portion, wherein the inner plate member further comprises a coupling protrusion formed below the lower hole and protruding in the outward direction, and wherein the fifth portion further includes a protrusion insertion hole defined therein into which the coupling protrusion is inserted.

9. The battery module assembly of claim 8, wherein the inner plate member includes a second groove defined therein that communicates with the lower hole, the second groove being formed below the lower hole, wherein a width of the second groove in the horizontal direction is smaller than a diameter of the lower hole, wherein the second groove is open in the outward direction, and wherein the fifth portion is inserted into the second groove.

10. The battery module assembly of claim 8, wherein, when viewed from a top perspective, the third portion and the fifth portion are spaced apart from each other in the horizontal direction.

11. The battery module assembly of claim 1, wherein
 the battery module assembly further comprises a pressing part being in contact with each of outer side surfaces of the pair of end plates, the pressing part extending in the horizontal direction, wherein the pressing part is configured to press each one of the pair of end plates respectively in an inward direction.

12. The battery module assembly of claim 11, wherein each one of the pair of end plates comprises:
 an inner plate member, the inner plate member being in contact with the cell stack; and
 an outer plate member coupled to an outer side surface of the inner plate member, and
 wherein the pressing part comprises:
 a first pressing member in contact with an outer side surface of the outer plate member; and
 a second pressing member coupled to a lower portion of the first pressing member, the second pressing member extending in the inward direction, wherein the second pressing member is in contact with the inner plate member.

13. The battery module assembly of claim 12, wherein an upper surface of the second pressing member is in contact with a lower end of the outer plate member.

14. The battery module assembly of claim 12, wherein the inner plate member comprises a pair of restriction portions protruding outward from front and rear sides of the second pressing member, and
 wherein the second pressing member is positioned between the pair of restriction portions.

15. The battery module assembly of claim 12, wherein the at least one end plate includes an upper hole defined therein into which the upper sensor member is inserted and a lower hole defined therein into which the lower sensor member is inserted is formed.

16. The battery module assembly of claim 2, wherein the outer plate member is coupled to the inner plate member through a thermal fusion process.

17. The battery module assembly of claim 2, wherein each one of the pair of end plates further comprises an adhesive member configured to adhere to an inner side surface of the outer plate member and an outer side surface of the inner plate member to adhere the outer plate member and the inner plate member to each other.

18. The battery module assembly of claim 2, wherein the outer plate member comprises:
 a contact region in contact with the inner plate member; and
 a separation region that is configured to be spaced apart from the inner plate member.

19. A battery module assembly, comprising:
 a plurality of battery cells stacked and arranged in a horizontal direction;
 a pair of end plates arranged on a first side and a second side of the plurality of battery cells in the horizontal direction; and
 a pair of sensor devices coupled to a respective one of the pair of end plates and configured to measure a temperature of the plurality of battery cells, wherein the pair of sensor devices each comprise:
 an upper sensor member disposed on an upper part of the respective one of the pair of end plates and configured to measure a temperature of an upper side of the plurality of battery cells; and
 a lower sensor member disposed on a lower part of the respective one of the pair of end plates and configured to measure a temperature of a lower side of the plurality of battery cells.

20. A battery module assembly, comprising:
 a cell stack comprising a plurality of battery cells, wherein the plurality of battery cells are arranged in a stacked formation in a horizontal direction;
 a first end plate provided on a first side of the cell stack in the horizontal direction;
 a second end plate provided on a second side of the cell stack in the horizontal direction; and
 a sensor device coupled to the first end plate and configured to measure a temperature of the cell stack, wherein the sensor device comprises:
  an upper sensor member disposed on an upper part of the first end plate and configured to measure a temperature of an upper side of the cell stack; and
  a lower sensor member disposed on a lower part of the first end plate and configured to measure a temperature of a lower side of the cell stack.

* * * * *